United States Patent [19]

Sowers

[11] 4,256,087
[45] Mar. 17, 1981

[54] SWIMMING POOL SOLAR HEATER

[76] Inventor: Charles Sowers, 5045 Medina Rd., Woodland Hills, Calif. 91364

[21] Appl. No.: 883,654

[22] Filed: Mar. 6, 1978

[51] Int. Cl.³ .............................................. F24J 3/02
[52] U.S. Cl. .................... 126/415; 126/426; 126/445; 4/498; 4/499
[58] Field of Search .............. 126/270, 271, 415, 416, 126/426, 443, 444, 445, 450; 4/172.12, 172.14, 498, 499, 502

[56] References Cited

U.S. PATENT DOCUMENTS

| | | | |
|---|---|---|---|
| 2,952,024 | 9/1960 | Bartolucci | 4/172.12 |
| 3,072,920 | 1/1963 | Yellott | 4/172.12 |
| 3,453,666 | 7/1969 | Hedges | 126/271 X |
| 4,061,132 | 12/1977 | Ashton et al. | 126/271 |
| 4,079,726 | 3/1978 | Voelker | 126/271 |
| 4,146,012 | 3/1979 | Elkins et al. | 126/271 |

Primary Examiner—James C. Yeung
Assistant Examiner—Larry Jones
Attorney, Agent, or Firm—Spensley, Horn, Jubas & Lubitz

[57] ABSTRACT

A flexible plastic solar heating panel, such as may be floated on the surface of a body of water and used to heat a swimming pool, comprised of a water supply manifold which communicates with one end of a plurality of water carrying tubes each of which communicates at their opposite end with a water collection manifold each of the water carrying tubes being separated from the next water carrying tube by one or more sealed tubes of air. The flexible solar heating panels may be interconnected to form a solar heating system which covers essentially the full surface of the swimming pool or other body of water.

8 Claims, 16 Drawing Figures

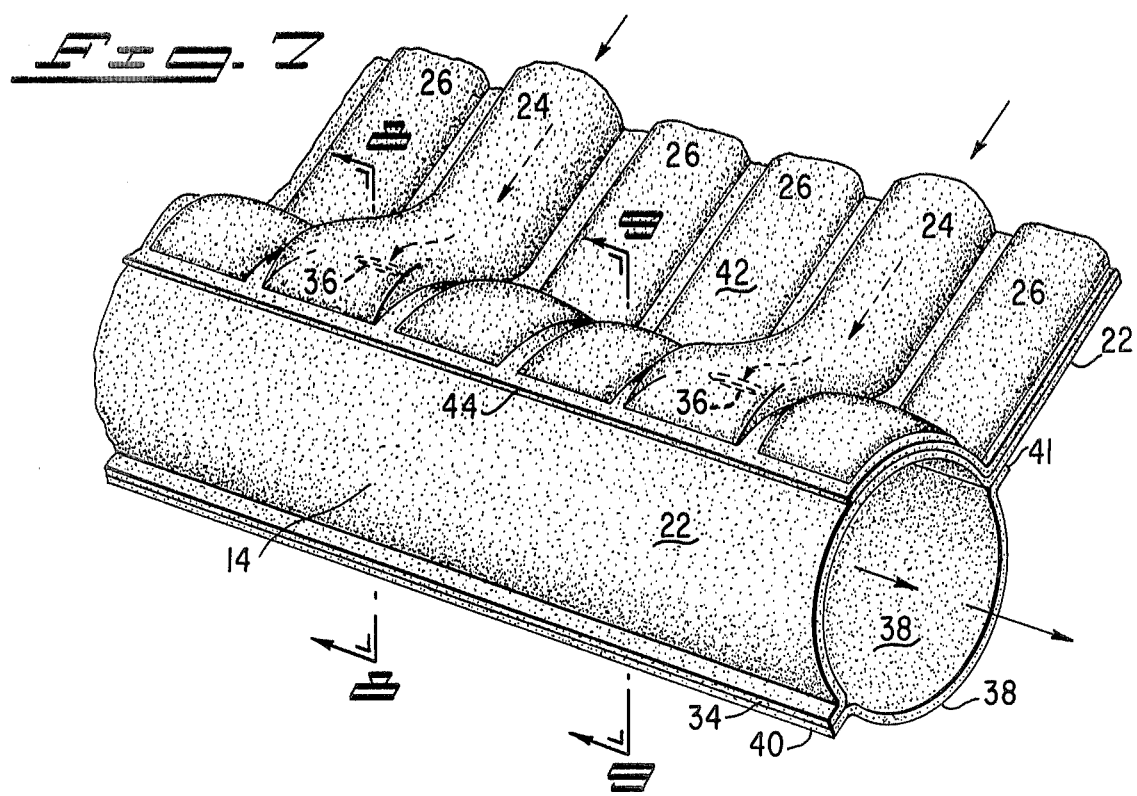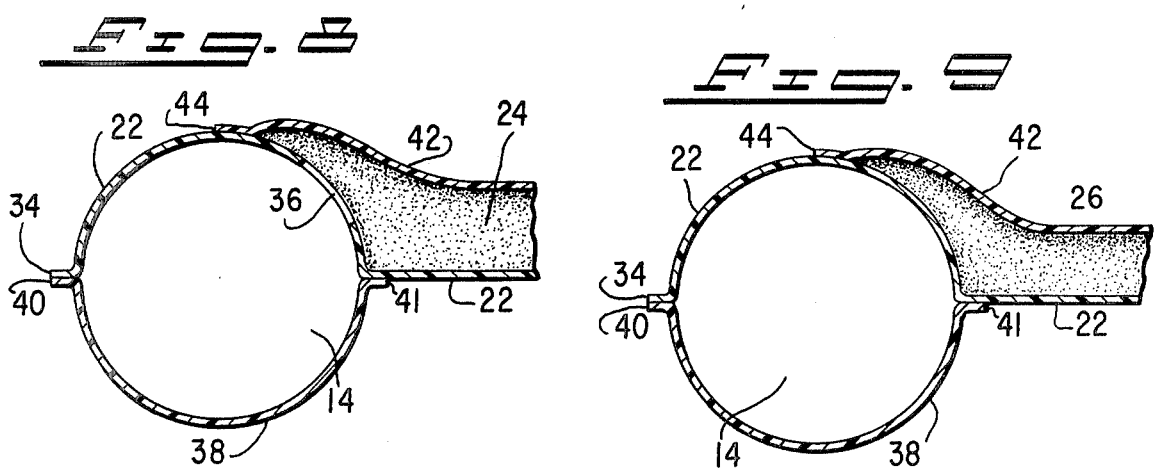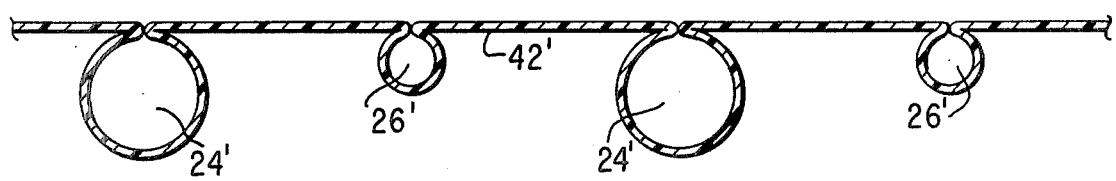

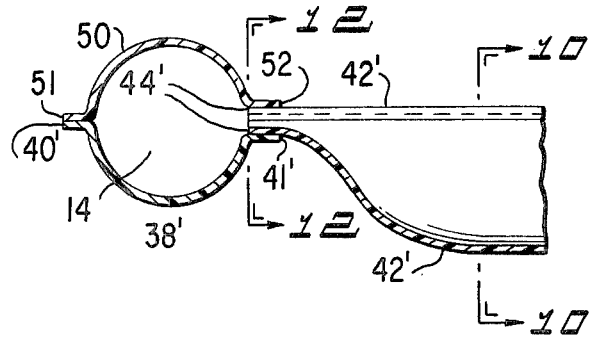
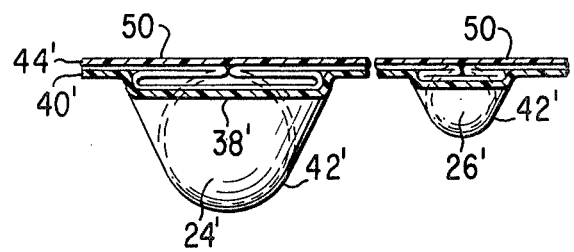
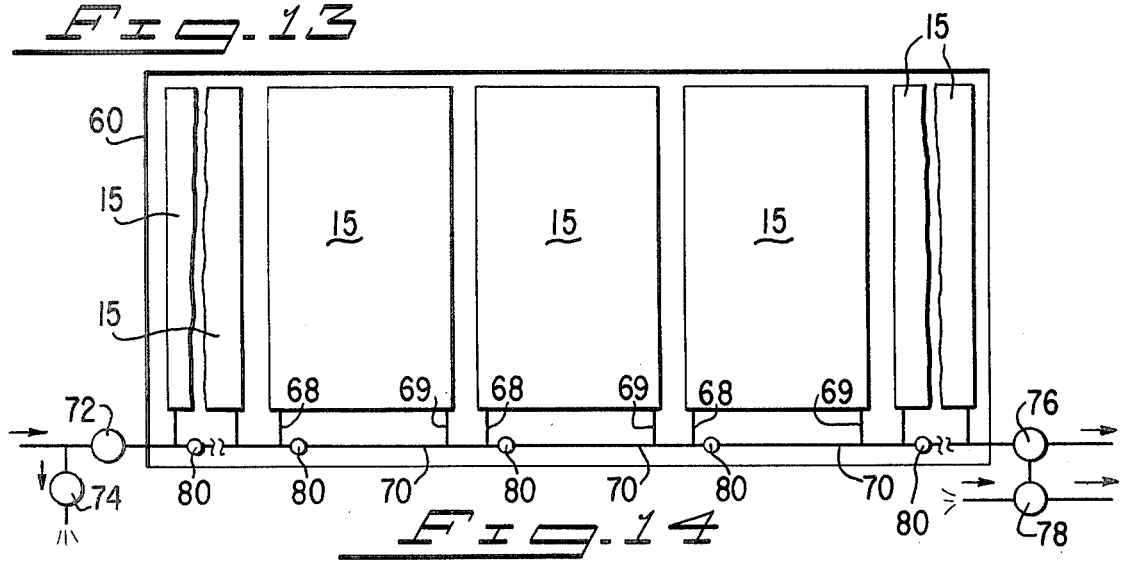
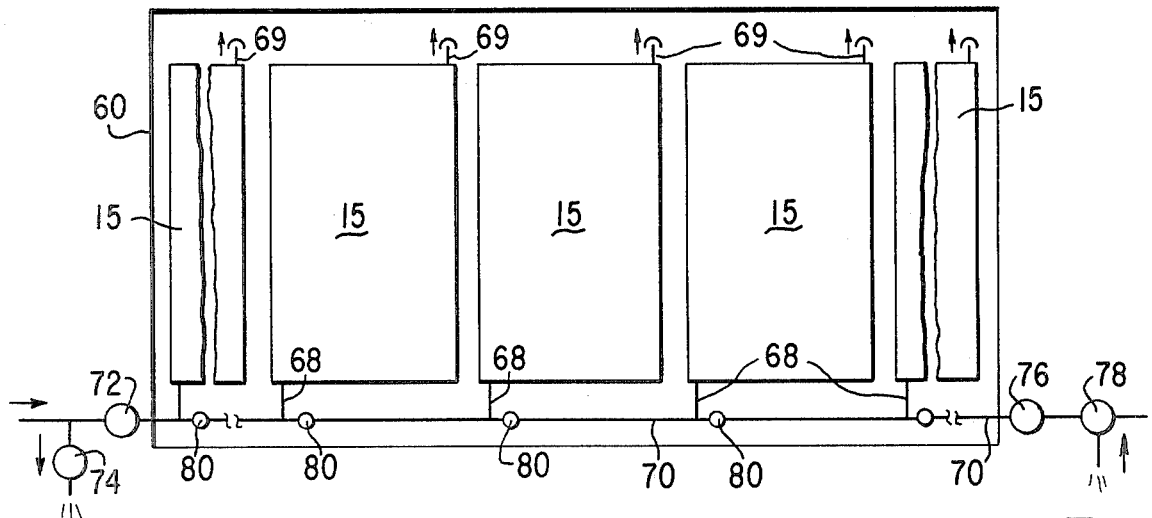
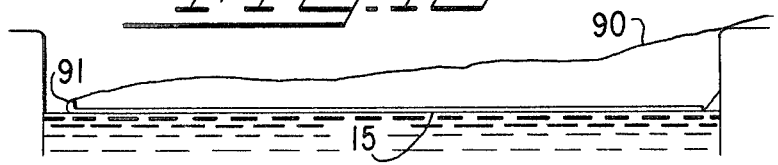
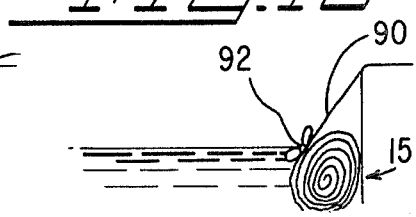

SWIMMING POOL SOLAR HEATER

BACKGROUND OF THE INVENTION

1. Field of the Invention

This invention relates to the field of solar heating and particularly to the solar heating of swimming pools.

2. Description of the Prior Art

There are a number of swimming pool solar heating devices designed to be floated on the surface of a swimming pool. Generally these devices fall into one of two categories. The first category consists of floatation devices made of a material designed to absorb solar energy and radiate this energy in the form of heat to the layer of pool water immediately beneath the device. Such devices are generally sized so as to be easily manipulated by a single person and it is intended that a plurality of such devices be disposed so as to cover as much of the pool surface as possible. The devices are typically removed from the water and stored during times when the pool is in use. Such devices heat only the surface of the water and as the temperature in this region rises the efficiency of heat transfer to the region decreases because of the decreased temperature gradient. A disadvantage of devices in this category is that they are manufactured in only a few standard sizes whether circular or rectangular. For devices of circular shape it is clear that there will be much space between such devices which cannot be utilized to collect solar energy and through which collected solar energy will escape to the air at night. Utilizing rectangular panels does not solve the problem. Unless the dimensions of the pool are an integral multiple of the dimensions of the rectangular panels there will be substantial gaps between the panels just as in the case of circular panels.

The second category comprises devices which are custom designed to fit the shape of a particular pool. There are thus no "gaps" which would reduce the amount of solar energy absorbed and allow heat loss to the air at night, but these devices are typically too large and heavy to be conveniently manipulated by a single person. The devices typically lay on the surface of the water and heat the surface water only by radiation.

Neither category of device employs a system for circulating the heated water so as to disperse the absorbed solar energy throughout the volume of the pool. Further, devices in such categories are removed from the pool for storage and thereby exposed to air which may shorten the life of certain materials.

It is therefor an object of the present invention to provide a solar heating system for a swimming pool or similar body of water which circulates the heated water to the bottom portions of the pool by means of the pool's own pump circulation system, and thus maintain a maximum temperature differential between the solar heating device and the surface of the fluid underneath it to effect the most efficient solar heat absorption.

It is another object of the invention to provide a solar heat accumulating panel designed to float on the pool surface without external support and designed to be manufactured in a standard width and an indefinite length such that the panel can be cut to a length suitable for either the width or length of a pool and as many panels used as necessary to fill the length or width of the pool, thereby covering substantially all of the pool. It is further desired that the panels be interconnectable in either a series or parallel fashion such that water may be supplied to each panel for circulation and collection of energy.

Another object of the invention is to provide a solar heat collecting panel as above which may be easily deflated, by attaching it to the suction side of the pump, and therefore is easily manipulated by a single person for easy storage at the edge of the pool in the water, rather than exposed to air, thereby prolonging its life.

It is a further object of the present invention to effect a solar heating panel as above which will deploy itself across the pool from the stored position upon application of water pressure at the inlet of the panel.

SUMMARY OF THE INVENTION

This invention consists of a unique interconnection of a plurality of flexible plastic sheets so as to provide a solar heating panel of a fixed width and an indefinite length. Formed along each lengthwise edge of the panel is a manifold for carrying water or other suitable liquid. Each manifold communicates with a plurality of tubular passageways running perpendicular to the manifolds, each passageway communicating with both manifolds at opposite ends. One manifold serves as intake and the other as collection and exhaust. Each tubular passageway is separated from the next tubular passageway by one or more sealed tubular chambers, extending from one manifold to the other, containing a quantity of air and thereby providing buoyancy for the panel.

By means of the pool's pump and filtering system water may be caused to enter the intake manifold of a plurality of such panels, pass into and through the plurality of tubular passageways to absorb solor energy and thereafter pass into the exhaust manifold from which the heated water is directed to the bottom of the pool for diffusion and mixing with the cooler water at the bottom of the pool and into the normal pool circulation system.

BRIEF DESCRIPTION OF DRAWINGS

FIG. 7 is a detailed perspective of a manifold portion of the panel in the filled condition.

FIG. 8 is a sectional view along the line 8—8 of FIG. 7 and illustrates the joining of a manifold and liquid carrying tube.

FIG. 9 is a sectional view along the line 9—9 of FIG. 7 and illustrates the joining of a sealed air tube with the manifold.

FIG. 10 is a section view of an alternate gathering pattern used in an alternate embodiment, taken along the line 10—10 of FIG. 11.

FIG. 11 is a sectional view of the alternate embodiment illustrating the joinder of a manifold and liquid passageway.

FIG. 12 is a sectional view along the line 12—12 of FIG. 11 and illustrates the construction of the liquid passageway and air tube joints with a manifold in the alternate embodiment.

FIG. 13 is a plan view of a series interconnection of a plurality of panels.

FIG. 14 is a plan view of a plurality of panels each having its own discharge to the bottom of the pool.

FIG. 15 shows an edge view of a panel deployed across a pool and the associated panel tie line.

FIG. 16 shows the panel in its stored position, secured by the tie line.

DETAILED DESCRIPTION OF THE INVENTION

Figure 1:
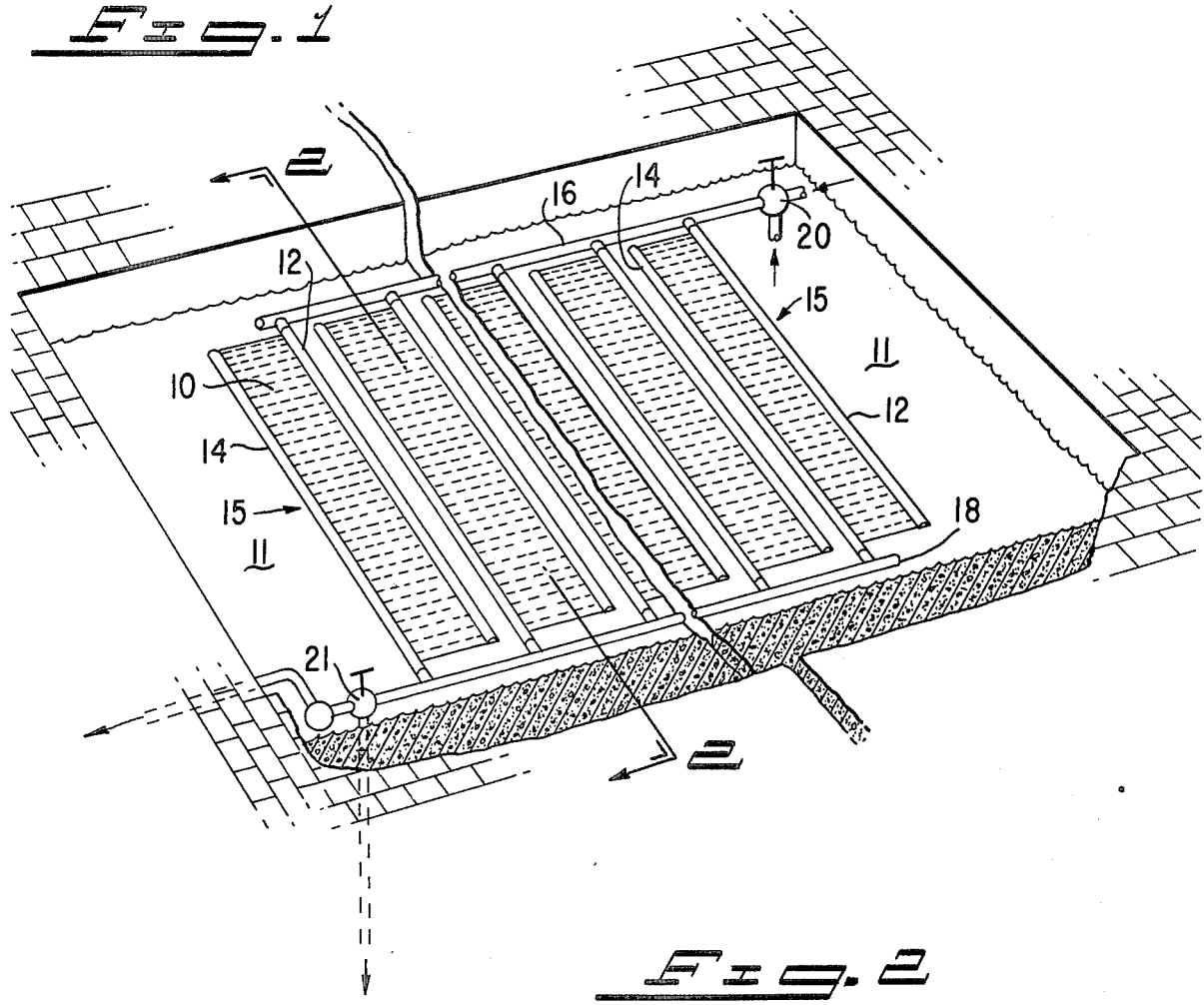
FIG. 1 is a perspective view of a swimming pool showing a plurality of panels of the present invention deployed thereupon.

The solar heating panel of the present invention is designed to float upon the surface of a body of liquid which is desired to be heated. As illustrated in FIG. 1 the invention is particularly adapted for heating swimming pools. The solar heating panel 15 is designed to be manufactured in a standard fixed width and in an indefinite length. The panel is intended to be coiled upon a spool and is thereby conveniently accessible for cutting to any desired length. As shown in FIG. 1, the panel would be cut to a length slightly less than either the length or width of the pool so as to leave sufficient room on each end for necessary pipe connections. A number of panels, cut to the appropriate lengths would be used side by side so as to extend nearly the entire width (or length) of the pool. In this way nearly the entire surface of the pool 11 is efficiently covered by the solar heating panels 15. Each panel has two manifolds each extending along the entire lengthwise edge of the panel 15.

A first manifold 12 serves as an intake manifold. Water is supplied to one end of the intake manifold and flows along its entire length for distribution at regular intervals along the manifold. A second manifold 14 extends along the opposite lengthwise edge of the panel and serves as a collection manifold. A valve 20 may be used to control the flow of fluid through supply line 16 which supplies water to the intake manifold 12 of each panel 15. Similarly the collection manifolds 14 all empty into a common collection pipe 18 which may have its flow regulated by a valve 21.

The central portion 10 of each panel, intermediate the intake manifold 12 and collection manifold 14 consists of a plurality of tubular water passageways 24 which at one end communicate with the intake manifold 12 and at their opposite end communicate with the collection manifold 14. Each water passageway 24 is separated from the next water passageway by one or more tubular sealed air chambers 26, as more clearly illustrated in FIG. 2.

Figure 2:
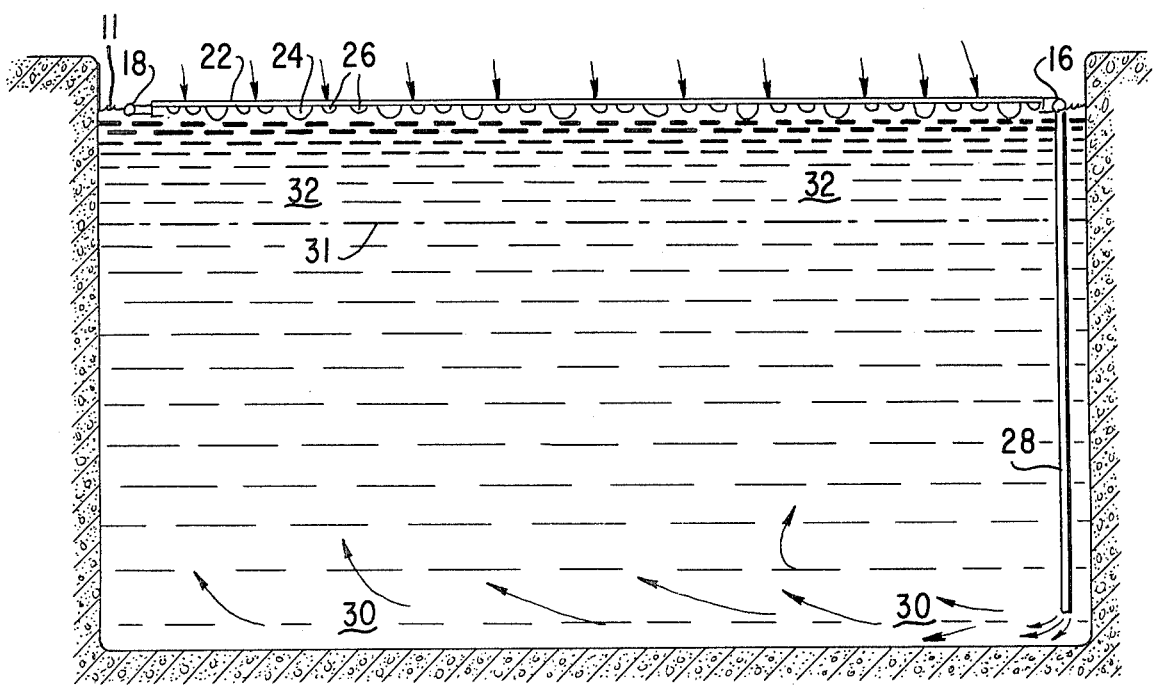
FIG. 2 is a section view along the line 2—2 of FIG. 1.

FIG. 2 illustrates the principle used by the present invention to remove solar energy in the form of heat from the surface layer of a pool and circulate this heat toward the bottom of the pool. This now warmed water rises from the bottom of the pool and is dispersed throughout the pool volume by thermal currents. As seen from above, the solar heating panel 15 appears flat in its central portion 10 and has two manifolds, one extending along each lengthwise edge. FIG. 2 shows a cross-section of this central portion 10 as it floats on the surface 11 of the pool. The upper most element of the solar heating panel 15 consists of a sheet of plastic 22. To the underside of this sheet of plastic 22 has been affixed a pleated sheet of plastic which has been thermally welded or otherwise suitably affixed to the sheet 22 between each pleat. Every third pleat is larger than the intervening two. There is thus effected a series of tubular passageways 24 and air chambers 26 as shown in FIG. 2 which extend beneath the surface of the water 11.

As the sun shines on a pool surface the water at the top of the pool is heated to a far greater extent than at the bottom. For instance, phantom line 31 may be thought of as dividing the pool into an upper warm area 32 and a lower cold area 30. To insure efficient heat transfer it is desirable to maintain a large temperature gradient between the medium absorbing the heat and the medium releasing the heat. Thus in the present invention water from the cold area 30 is circulated through the water passageways 24 located at the surface of the warm area 32. This circulating water absorbs heat directly from the structure of the panels 15 and in addition absorbs heat from the upper warm area 32 of water. The circulating water is then directed to the bottom cold area 30 of the pool via conduit 28. The warm water enters area 30 and creates thermal currents which tend to distribute the warm water throughout the pool.

In order to insure most efficient absorption of solar energy, it is desired that the upper warm area 32 of water be kept as cool as possible. This is accomplished by circulating cold water from the bottom of the pool through the water passageways 24.

The sealed air chambers 26 serve three functions. First, they absorb solar energy and transfer it to the upper layer of water in the pool. They also provide the solar panel 15 with buoyancy and, at night serve to a certain extent to insulate the warm pool surface from the cool night air, thus retaining the heat collected during the day. During the day the sunlight strikes the surface of the panel 15 and the heat is absorbed by the upper layer of pool water, ready to be absorbed by the circulation of water through the panel 15.

Figure 3:
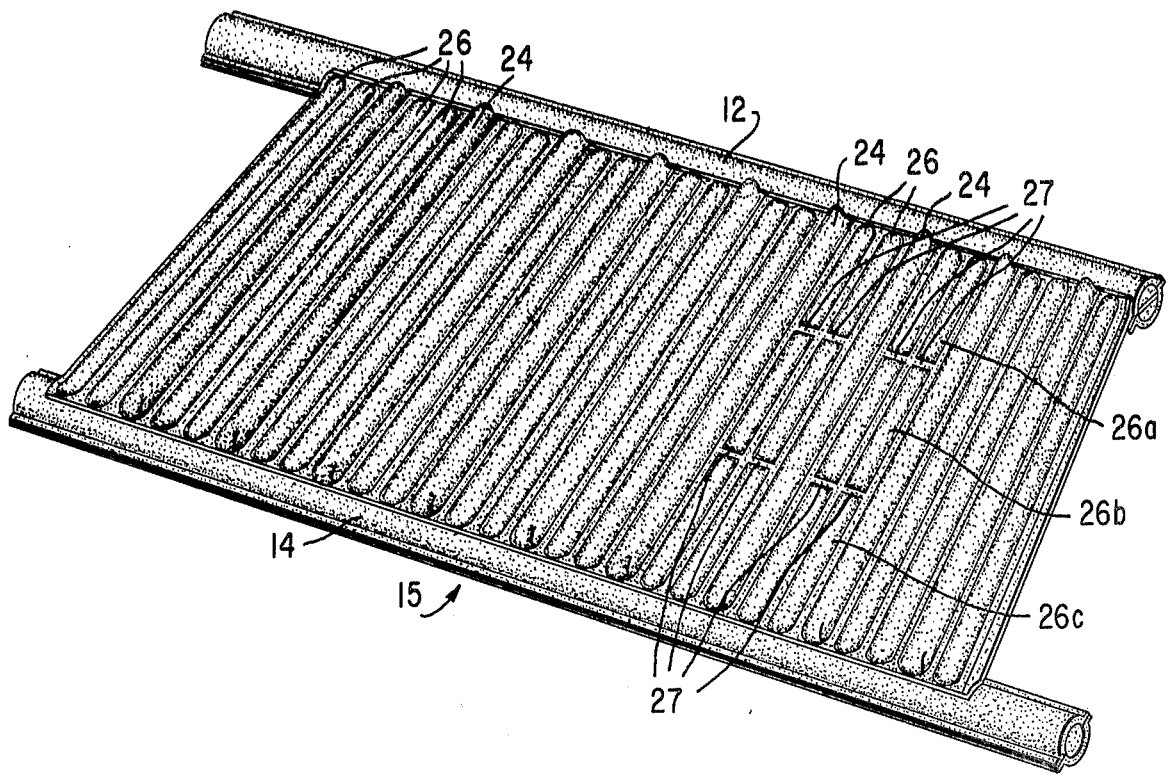
FIG. 3 is a perspective of a portion of a panel.

A more detailed view of the solar panel 15 is shown in FIG. 3, a perspective of the underside of the panel as shown in FIG. 1. The intake manifold 12 and collection manifold 14 are caused to take on a rounded tubular shape by the pressure of the water flowing through them. In the embodiment of FIG. 3, each water passageway 24 is separated from the next by two sealed air chambers 26. Other variations can easily be constructed such as alternating pairs of water passageways and pairs of air chambers or providing two water passageways followed by three air chambers followed by two water passageways etc. Additionally, each air chamber may be sealed intermediate its ends such that it is formed of a plurality of end-to-end air chambers. In this way the air in a given chamber is prevented from being compressed toward one side of the panel which might cause the panel to list. This is illustrated in FIG. 3 where the intermediate seals are designated 27, forming end-to-end air chambers 26a, 26b and 26c. The variations are endless.

Figure 4:
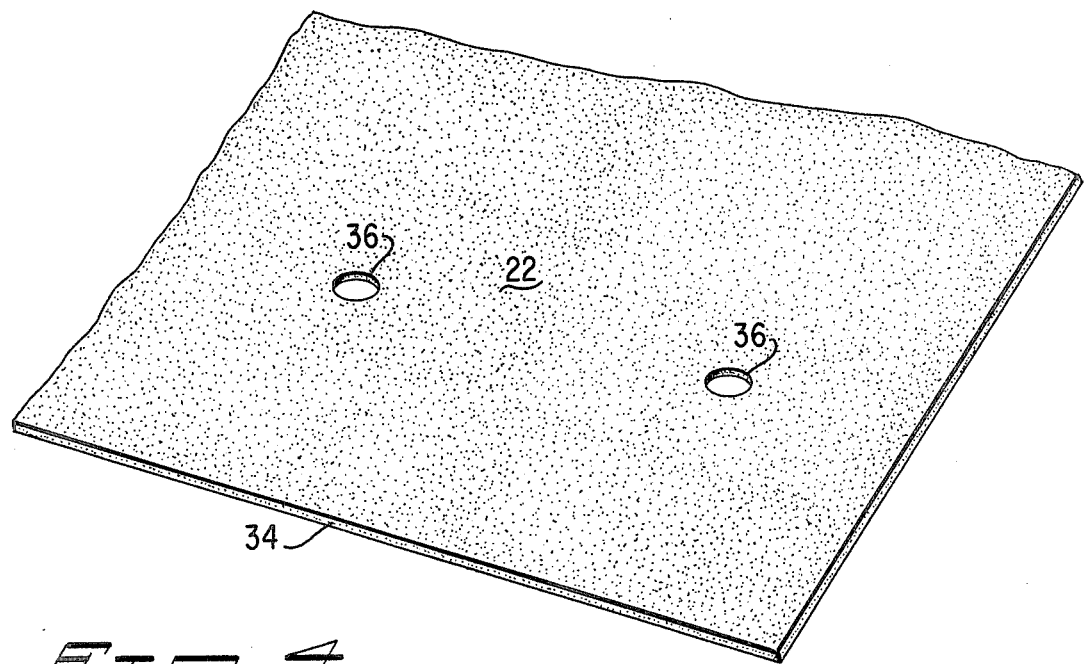
FIG. 4 is a perspective of one edge portion of one of the sheets of plastic used in construction of the panel.

The construction of the preferred embodiment of the solar panel 15 is effected by the interconnection of four sheets of plastic. A portion of the first sheet 22 is shown in FIG. 4. This is a portion of one edge 34 of the sheet. The opposite edge portion of the sheet is identical. Both edge portions of sheet 22 have a series of uniformly spaced holes 36 punched in the sheet. These holes are the means by which the water passageways 24 communicate with the intake manifold 12 and collection manifold 14.

Figure 5:
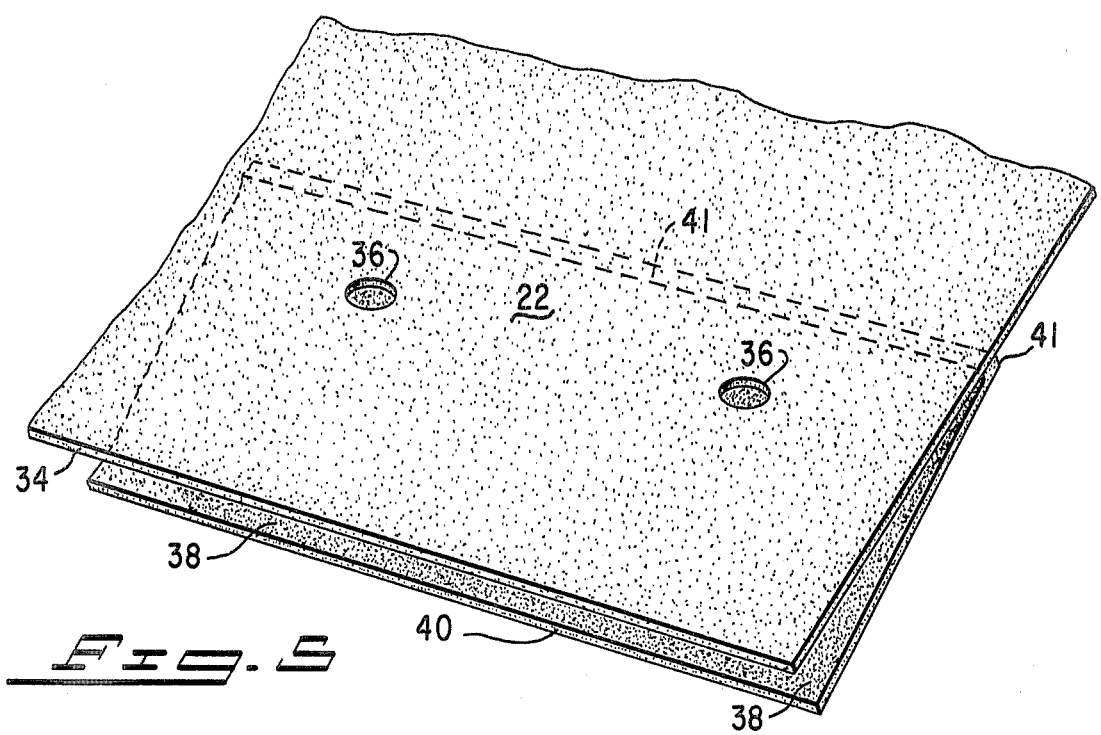
FIG. 5 shows a second sheet of plastic joined along the underside of the edge portion of the sheet in FIG. 4.

On one side of sheet 22 and along each lengthwise edge thereof is secured a narrow sheet 38 of plastic. The narrow sheet 38 of plastic has a first edge 40 and a second edge 41. The narrow sheet 38 is oriented such that its first edge is aligned with the edge 34 of sheet 22, and its second edge 41 lies a greater distance from edge 34 than is the series of holes 36. When thus aligned the edge 41 is thermally bonded in place to sheet 22 as illustrated in FIG. 5.

Figure 6:
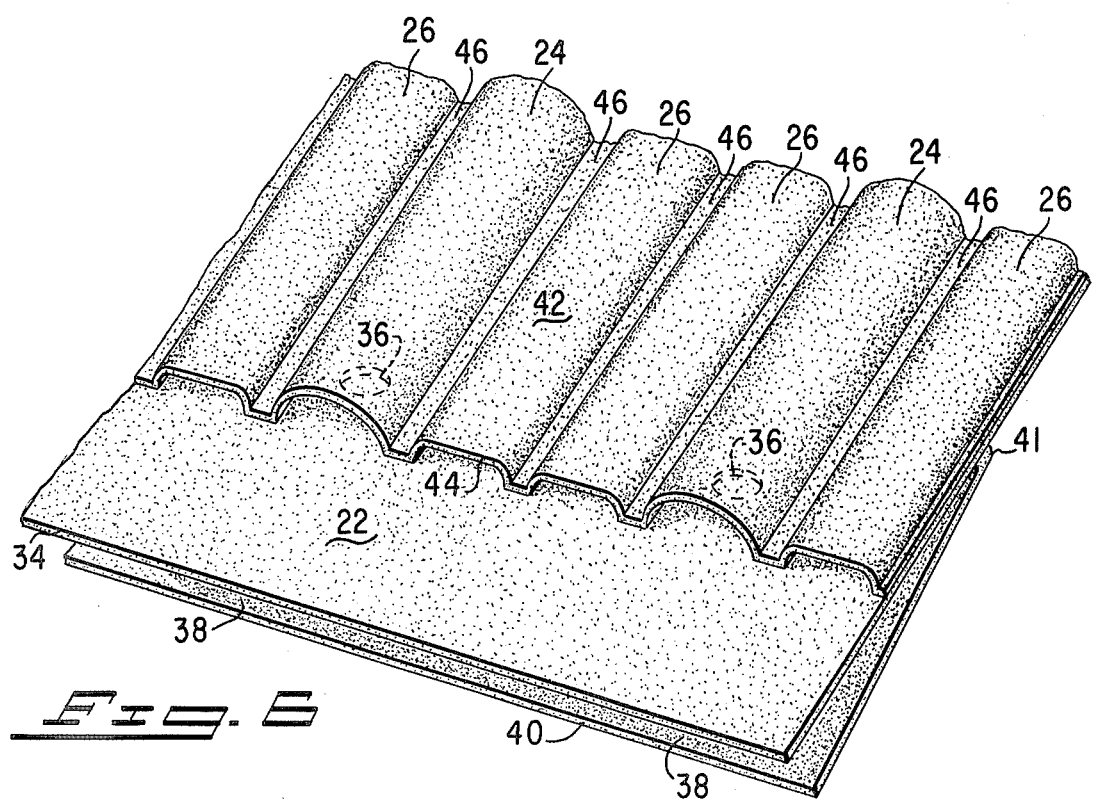
FIG. 6 is a perspective illustrating the addition of a gathered sheet of plastic to the configuration of FIG. 5.

On the other side of sheet 22 and oriented to be centered along the longitudinal centerline of sheet 22 is placed a pleated plastic sheet 42. This sheet 42 is of a width such that each lengthwise edge 44 lies between the series of holes 36 and edge 34 of sheet 22. When properly positioned the pleated sheet 42 is thermally bonded to sheet 22 between each pleat. These bonds 46 thus define the water passageways 24 and air chambers 26 as shown in FIG. 6. Two bonds remain to complete formation of the solar heating panel. Edge 44 is bonded in place to sheet 22 and edge 34 is bonded to edge 40.

FIG. 7 illustrates a section of the panel as it might appear when pressurized. The bonding of edge 34 and edge 40 and the bonding of edge 44 to sheet 22 are clearly shown. It should also be noted that the pleated sheet 42 is longitudinally positioned such that a water passageway 24 is located over a hole 36. Water thus may flow between a passageway 24 and a manifold 14 (or 12) through the hole 36. No hole occurs within the limits of the sealed air chambers 26 and these chambers are thus closed from communication with a manifold. FIG. 8 illustrates the ability of water passageway 24 to communicate with manifold 14 through hole 36, whereas FIG. 9 shows sealed air chamber 26 separated from manifold 14 by a portion of sheet 22 having no hole.

FIG. 10 illustrates an alternate construction of the water passageway 24 and air chamber 26. Instead of using two sheets such as 22 and pleated sheet 42, a single sheet 42' may be pleated and the edges of the pleats brought in contact and thermally bonded together to form the water passageway 24' and the air chamber 26'. Two narrow sheets 50 and 38' are then bonded as shown in FIG. 11 over each edge of the pleated sheet 42' to provide the manifold 14 (or 12). When edge 52 of sheet 50 and edge 41' of sheet 38' are bonded to edge 44' of sheet 42' care must be taken that the end of each water passageway 24' is not bonded closed. As shown in FIG. 12 water passageway 24' communicates with manifold 14 (or 12) through the unbonded ends, whereas the ends of air chambers 26' are purposely bonded closed to seal the air chamber.

Solar heating panels 15 of the above constructions can be interconnected in a variety of ways to form a system of panels which covers the surface of a pool. One such interconnection is illustrated in FIG. 13. This is referred to as a series interconnection. In this configuration the pool 60 contains a plurality of solar heating panels 15 each of which has an inlet 68 and an outlet 69 which connect to a common supply and discharge pip 70. Pressure regulating valves 80 are located in pipe 70 between the inlet 68 and outlet 69 of each panel 15. Other valving such as valves 72, 74, 76 and 78 can be suitably arranged and manipulated to keep the water pressure low enough that the panels do not burst.

FIG. 14 is a similar configuration except each panel 15 has its outlet pipe 69 located at the end of the panel away from the supply pipe 70 and each panel individually discharges its heated water toward the bottom of the pool. Again suitable valving such as valves 72, 74, 76, 78 and 80 can be arranged to regulate pressure and flow direction.

In either configuration (FIGS. 1, 13 or 14) the valving can be manipulated so as to cause the pump to remove the water from the water passageways 24 and manifolds 12 and 14. This greatly reduces the weight of a panel and by means of suitable ropes such as 90 which pass around one end of the panels, a single person can roll up each panel in turn and secure it to the side of the pool as illustrated in FIGS. 15 and 16. When secured as by a simple knot 92 the greater portion of the panel 15 is protected from sunlight, and a portion is immersed in water. This lengthens the useful life of the panels.

When the knot 92 is untied, the panel 15 may be automatically deployed across the pool by simply applying water pressure to the intake manifold of each panel.

Having thus described the several embodiments of the solar heating panel, it will be obvious to those skilled in the art that many alterations may be made in the substances employed, the manner of construction, and other features of the invention without departing from the spirit and scope of the invention which is intended to be limited only by the scope of the appended claims.

What is claimed is:

1. A solar heating panel for floating on a swimming pool and for transferring heat to said swimming pool comprising:

spaced water intake and collection manifolds and a plurality of water passageways laterally spaced from one another and fluid connected to said manifolds, a plurality of air chamber means at least some of which are disposed between at least some of said water passageways for absorbing solar energy and transferring said absorbed energy to the upper layer of water in the pool, for providing buoyancy and for providing night time insulation to the pool water, said air chamber, means thereby providing heat by solar energy to an upper layer of pool water, said water passageways having the upper portion thereof exposed to solar radiation to absorb heat therefrom, and the lower portion thereof in engagement with the upper portion of the pool water additionally to absorb thermal energy therefrom.

2. A solar heating panel according to claim 1 constructed of four sheets of flexible material of arbitrary length:

the first of said four sheets being provided with two series of holes, one series along each lengthwise edge, each series of holes being generally parallel to said lengthwise edge;

the second of said four sheets having a first lengthwise edge and a second lengthwise edge and positioned on said first sheet such that the first lengthwise edge lies on one side of one series of holes and said second lengthwise edge lies on the other side of the same series of holes, said first and second lengthwise edges being bonded to said first of said four sheets;

the third of said four sheets, having a third lengthwise edge and a fourth lengthwise edge, is positioned on the same surface of said first sheet as is said second sheet such that the third lengthwise edge lies on one side of the other series of holes and said fourth lengthwise edge lies on the other side of that same series of holes, said third and fourth lengthwise edges being bonded to said first of said four sheets; the fourth of said four sheets being of a width sufficient to cover both series of holes simultaneously, said width being defined by a fifth lengthwise edge and sixth lengthwise edge, said fourth sheet being pleated laterally and placed upon that surface of said first sheet which is opposite said second and third sheets, said fourth sheet being bonded to said first sheet along said fifth lengthwise edge, said sixth lengthwise edge and laterally between each pleat.

3. The solar heating panel of claim 1 further comprising a pump means for drawing fluid out of said panel; said manifolds and said passageways thereby being caused to collapse and thereby facilitate movement of the panel to a storage position.

4. The solar heating panel according to claim 1 wherein at least some of said air chambers are further divided into a plurality of smaller air chambers such that at least some of said air chambers do not completely span the distance between said intake manifold and said collection manifold.

5. The solar heating panel of claim 1, said water passageways extending deeper into the water than said air chamber means.

6. The solar heating panel of claims 1 or 5, said panel being substantially entirely constructed of flexible plastic sheets.

7. The solar heating panel of claim 1, there being at least one air chamber means between each pair of said water passageways.

8. A solar heating panel constructed of five sheets of flexible material of arbitrary length and designed for circulating a fluid heat transfer medium therethrough comprising:
an intake manifold;
a collection manifold;
a plurality of fluid passageways which communicate with both the intake and collection manifold;
a plurality of sealed air chambers interspersed among, and substantially coplanar with, the fluid passageways;
the first of said five sheets having a first and second edge and being provided with a plurality of laterally extending pleats which have their opposite edges bonded together so as to form said passageways and said chambers on one side of the first sheet and present a smooth surface on the other side of said first sheet;
the second, third, fourth and fifth of said five sheets each having a first edge and a second edge, said second edge of said second and third sheets being bonded on one side of said first sheet along the first and second edges of said first sheet;
said second edge of said fourth and fifth sheets being bonded to the other side of said first sheet along the first and second edges thereof respectively;
the first edges of said second and fourth sheets being bonded together so as to form the intake manifold and the first edges of said third and a fifth sheets being bonded together so as to form the collection manifold;
said passageways having an inflated diameter larger than the inflated diameter of said chambers.

* * * * *